US009009838B2

(12) United States Patent
Britton et al.

(10) Patent No.: US 9,009,838 B2
(45) Date of Patent: *Apr. 14, 2015

(54) METHOD AND APPARATUS FOR EFFECTING AN INTERNET USER'S PRIVACY DIRECTIVE

(75) Inventors: Zachary Edward Britton, Toulumne, CA (US); Derek Stephen Maxson, Twain Harte, CA (US); Brian Mathew Blocher, Oakdale, CA (US); Thabo Husayn Fletcher, Sonora, CA (US); Scott Kenneth Smith, Modesto, CA (US); Carlos Alberto Vazquez, Chula Vista, CA (US)

(73) Assignee: Front Porch, Inc., Sonora, CA (US)

( * ) Notice: Subject to any disclaimer, the term of this patent is extended or adjusted under 35 U.S.C. 154(b) by 1297 days.

This patent is subject to a terminal disclaimer.

(21) Appl. No.: 12/258,787

(22) Filed: Oct. 27, 2008

(65) Prior Publication Data
US 2010/0024032 A1     Jan. 28, 2010

Related U.S. Application Data

(60) Provisional application No. 61/083,474, filed on Jul. 24, 2008.

(51) Int. Cl.
*G06Q 30/02* (2012.01)

(52) U.S. Cl.
CPC ..................... *G06Q 30/02* (2013.01)

(58) Field of Classification Search
CPC ............................ H04L 63/1408; G06Q 30/02
See application file for complete search history.

(56) References Cited

U.S. PATENT DOCUMENTS

| 5,761,673 | A  | * | 6/1998 | Bookman et al. | ............. 719/311 |
| 6,233,618 | B1 |   | 5/2001 | Shannon |  |
| 6,393,479 | B1 | * | 5/2002 | Glommen et al. | ............. 709/224 |
| 6,438,125 | B1 | * | 8/2002 | Brothers | ....................... 370/352 |
| 7,003,565 | B2 |   | 2/2006 | Hind et al. |  |
| 7,039,699 | B1 | * | 5/2006 | Narin et al. | ................... 709/224 |

(Continued)

FOREIGN PATENT DOCUMENTS

| WO | 2009011728 A2 | 1/2009 |
| WO | 2010011449 A1 | 1/2010 |
| WO | 2010138213 A1 | 12/2010 |

OTHER PUBLICATIONS

White, How Computers Work, 2004, Que Corp., 7th Ed., all pages.*

(Continued)

*Primary Examiner* — Jacob C. Coppola
(74) *Attorney, Agent, or Firm* — Robroy R. Fawcett

(57) ABSTRACT

Disclosed is a method for effecting an internet user's privacy directive. In the method, copied packets, that are based on original packets sent from a user client, are monitored for a web content request including state information that is not in compliance with a user's privacy directive. Upon detection of a copied packet having a web content request including non-compliant state information, the state information is modified to comply with the user's privacy directive. A replacement packet is forwarded to the user client such that the user client receives the replacement packet before receiving a response packet from a target server of the corresponding original packet. The replacement packet has a redirection with a renewed web content request including the modified state information.

21 Claims, 8 Drawing Sheets

(56) References Cited

U.S. PATENT DOCUMENTS

| | | |
|---|---|---|
| 7,260,697 B2 | 8/2007 | Okada |
| 7,509,408 B2 | 3/2009 | Kurita |
| 7,600,016 B2 | 10/2009 | Bean |
| 7,620,697 B1 | 11/2009 | Davies |
| RE41,148 E | 2/2010 | Burnside et al. |
| 7,725,926 B1 | 5/2010 | Karp et al. |
| 7,779,103 B1 * | 8/2010 | Fikes et al. .................. 709/223 |
| 7,953,851 B2 * | 5/2011 | Britton et al. ................ 709/224 |
| 8,214,486 B2 * | 7/2012 | Britton et al. ................ 709/224 |
| 8,478,862 B2 * | 7/2013 | Britton et al. ................ 709/224 |
| 2001/0032139 A1 | 10/2001 | Debonnett |
| 2001/0055274 A1 * | 12/2001 | Hegge et al. ................. 370/229 |
| 2002/0116531 A1 | 8/2002 | Chu |
| 2002/0120666 A1 | 8/2002 | Landsman et al. |
| 2002/0128925 A1 | 9/2002 | Angeles |
| 2002/0138331 A1 | 9/2002 | Hosea et al. |
| 2002/0184364 A1 | 12/2002 | Brebner |
| 2003/0050863 A1 | 3/2003 | Radwin |
| 2003/0115546 A1 | 6/2003 | Dubey et al. |
| 2003/0182583 A1 | 9/2003 | Turco |
| 2004/0015600 A1 | 1/2004 | Tiwary et al. |
| 2004/0073533 A1 | 4/2004 | Mynarski et al. |
| 2004/0122943 A1 | 6/2004 | Error et al. |
| 2005/0015429 A1 * | 1/2005 | Ashley et al. ................ 709/200 |
| 2005/0216421 A1 | 9/2005 | Barry et al. |
| 2005/0216844 A1 | 9/2005 | Error et al. |
| 2005/0257250 A1 * | 11/2005 | Mitchell et al. .................. 726/3 |
| 2006/0136372 A1 | 6/2006 | Schunemann |
| 2006/0136524 A1 * | 6/2006 | Wohlers et al. .............. 707/204 |
| 2006/0174327 A1 | 8/2006 | Song et al. |
| 2006/0288096 A1 | 12/2006 | Yim |
| 2007/0143829 A1 | 6/2007 | Hinton et al. |
| 2007/0204223 A1 | 8/2007 | Bartels et al. |
| 2007/0245137 A1 * | 10/2007 | Bhagat et al. ................. 713/153 |
| 2008/0040224 A1 | 2/2008 | Roker |
| 2008/0052392 A1 | 2/2008 | Webster et al. |
| 2008/0126446 A1 * | 5/2008 | Brunet et al. ................. 707/204 |
| 2008/0126567 A1 * | 5/2008 | Wilson ......................... 709/248 |
| 2008/0201331 A1 | 8/2008 | Eriksen et al. |
| 2008/0222283 A1 | 9/2008 | Ertugrul et al. |
| 2009/0019148 A1 * | 1/2009 | Britton et al. ................ 709/224 |
| 2009/0030774 A1 | 1/2009 | Rothschild et al. |
| 2009/0037579 A1 | 2/2009 | Error et al. |
| 2009/0077163 A1 * | 3/2009 | Ertugrul et al. .............. 709/203 |
| 2009/0080421 A1 * | 3/2009 | Ou ............................... 370/389 |
| 2009/0099931 A1 | 4/2009 | Aaltonen et al. |
| 2009/0113532 A1 * | 4/2009 | Lapidous .......................... 726/7 |
| 2009/0157875 A1 * | 6/2009 | Britton et al. ................ 709/224 |
| 2009/0177771 A1 | 7/2009 | Britton et al. |
| 2009/0216882 A1 | 8/2009 | Britton et al. |
| 2009/0254971 A1 * | 10/2009 | Herz et al. ........................ 726/1 |
| 2009/0293018 A1 * | 11/2009 | Wilson et al. ................. 715/811 |
| 2010/0306052 A1 | 12/2010 | Britton et al. |

OTHER PUBLICATIONS

Written Opinion of International Search Report; PCT/US2009/047709; Jul. 31, 2009.
International Search Report; PCT/US2008/005741; Sep. 5, 2008.
Written Opinion of International Search Report; PCT/US2008/005741; Sep. 5, 2008.
International Search Report; PCT/US2010/020670; Mar. 9, 2010.
Written Opinion of International Search Report; PCT/US2010/020670; Mar. 9, 2010.

* cited by examiner

Set-Cookie: NAI=OPT_OUT; path=/; expires=Wednesday, 09-Nov-2023 23:12:40 GMT

| 410 | 420 | 430 | 440 |

| Domain (510) | Opt-Out Key (520) | Opt-Out Value (530) |
|---|---|---|
| .retsco.net | NETOPTOUT | TRUE |
| .adrotator.com | NAI | OPT_OUT |
| .spclick.net | NAI | 1 |
| .togada.net | TID | togaoptout |
| .google.com | | |

| IP Address (810) | Service Type (820) |
|---|---|
| 10.10.10.1 | 1 |
| 10.10.10.2 | 2 |
| 10.10.10.3 | 2 |
| 10.10.10.4 | 1 |
| 10.10.10.5 | 3 |

Frame 2 (213 bytes on wire, 213 bytes captured)                                    700
  Arrival Time: May 8, 2008 08:50:48.183100000
  [Time delta from previous captured frame: 0.021444000 seconds]
  [Time delta from previous displayed frame: 0.021444000 seconds]
  [Time since reference or first frame: 0.021444000 seconds]
  Frame Number: 2
  Frame Length: 213 bytes
  Capture Length: 213 bytes
  [Frame is marked: False]
  [Protocols in frame: eth:ip:tcp:http]
  [Coloring Rule Name: HTTP]
  [Coloring Rule String: http || tcp/port == 80]
Ethernet II, Scr: Vmware 40:1a:3e (00:0c:29:40:1a:3e), Dst: Dell_ba:a8:d1 (00:1d:09:ba:a8:d1)
710   Destination: Dell ba:a8:d1 (00:1d:09:ba:a8:d1)
      Source: Vmware 40:la:3e (00:0c:29:40:1a:3e)
      Type: IP (0x0800)
Internet Protocol, Src: 74.125.19.147 (74.125.19.147), Det: 192.168.200.57 (192.168.200.57)
  Version: 4
  Header length: 20 bytes
  Differentiated Services Field: 0x00 (DSCP 0x00: Default; ECN: 0x00)
  Total Length: 199
  Identification: 0x04b0 (1200)
  Flags: 0x04 (Don't Fragment)
720   Fragment offset: 0
      Time to live: 128
      Protocol: TCP (0x06)
730   Header checksum: 0x0e8f (correct)
      Source: 74:125:19:147 (74:125:19:147)
      Destination: 192.168.200.57 (192.168.200.57)
Transmission Control Protocol, Src Port: http (80-), Dst Port: 4224 (4224), Seq:1, Ack: 1059, Len: 159
  Source port: http (80)
740   Destination port: 4224 (4224)
      Sequence number: 1    (relative sequence number)
      [Next sequence number: 160    (relative sequence number)]
  Acknowledgement number: 1059    (relative ack number)
750   Header length: 20 bytes
      Flags: 0x19 (FIN, PSH, ACK)
      Window size: 1460
  Checksum: 0x1d52 (correct)
  [SEQ/ACK analysis]
Hypertext Transfer Protocol
  HTTP/1.1 302 Found\r\n
  Set-Cookie: optout=true; expires-Thu, 25-Dec-2008 00:00:00 GMT;\r\n
  Location: http://192.168.200.59/PASV/02020100000200010802030407 0A0B08/\r\n
  \r\n
760

FIG. 7

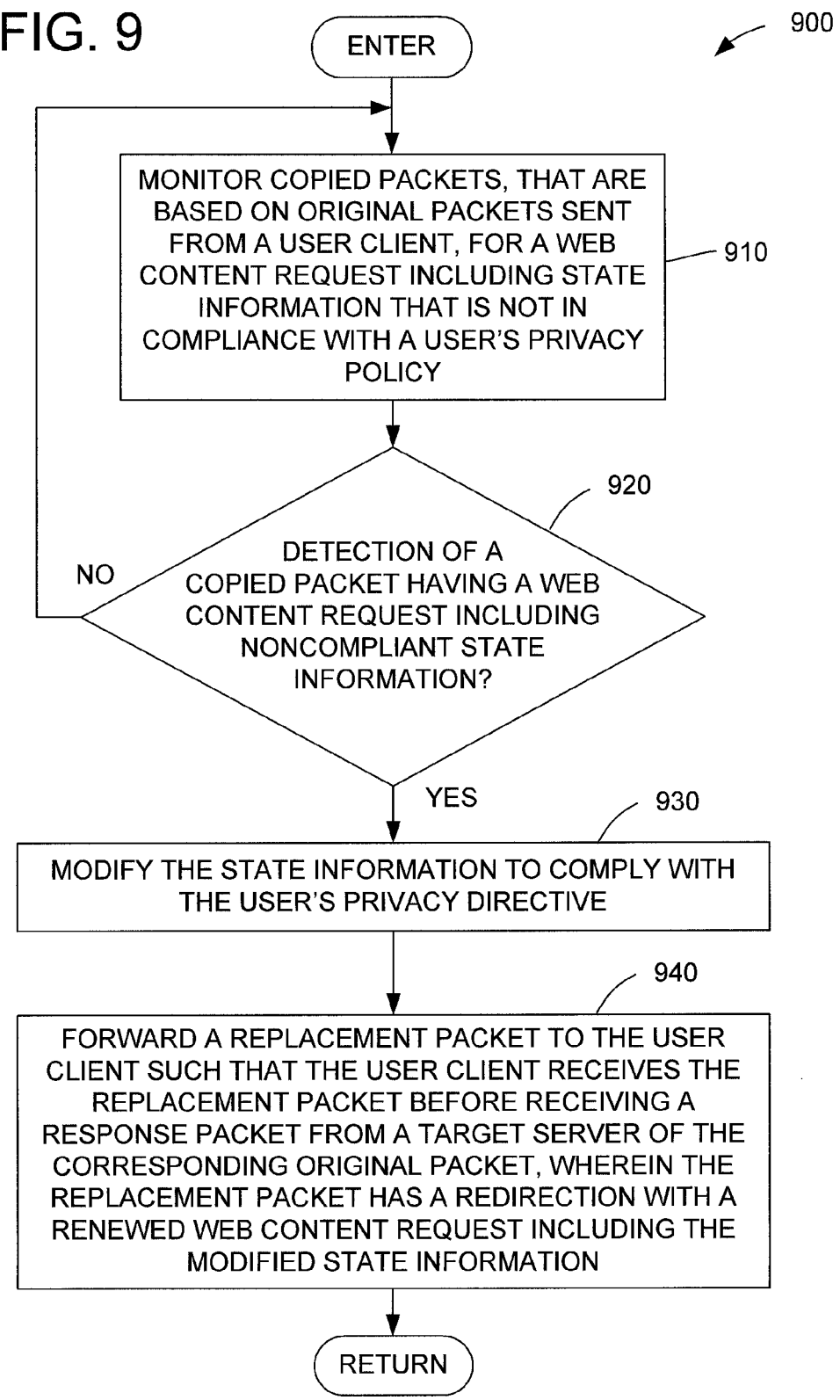

METHOD AND APPARATUS FOR EFFECTING AN INTERNET USER'S PRIVACY DIRECTIVE

CROSS-REFERENCE TO RELATED APPLICATION

This application claims the benefit of U.S. Provisional Application No. 61/083,474, having an assigned filing date of Jul. 24, 2008, which application is incorporated herein by reference.

BACKGROUND OF THE INVENTION

1. Field of the Invention

The present invention relates to internet user privacy, and more particularly, to a method and apparatus for effecting an internet user's privacy directive without incurring undesirable latency.

2. Description of the Prior Art and Related Information

Internet users are increasingly concerned about being tracked as they visit web sites. Advertising networks are among those who use cookies extensively to record information about a user for use in future advertising and content personalization. Users desiring to opt-out of these services face significant hurdles. Using cookies to maintain a user's opt-out choices is not a persistent solution. In addition, since there are hundreds of advertising networks and millions of domains, ensuring the persistence of user choice is unwieldy.

The user's opt-out choices may be lost due to any one or more of the following occurrences: 1) the purchase of a new computer, or reloading on an existing computer; 2) use of a new web browser; 3) a different profile on the same computer to access the internet; 4) existing cookies are cleared inadvertently; 5) cookies are cleared by a security program; or 6) the opt-out cookies expire. Most users are not aware that their opt-out choices can be "forgotten" so easily.

Also frustrating internet users is the fact that there are currently over six hundred advertising networks, and not all such networks allow the user to opt-out. Further, it is difficult for a user to know what information has already been collected by the advertising networks.

Privacy advocates have asked government agencies in several countries to create a centralized approach to opt-out of targeted advertising similar to the "Do Not Call" list for telephone marketing. Currently, government agencies have not set unified standards for approaching internet user privacy, and advertising networks are not inclined to provide simple access to opt-out facilities due to the potential for decreased revenue.

Accordingly, there exists a need for addressing an internet user's privacy concerns in an efficient and cost effective manner. The present invention satisfies these needs.

SUMMARY OF THE INVENTION

An aspect of the present invention may reside in a method for effecting an internet user's privacy directive. In the method, copied packets, that are based on original packets sent from a user client, are monitored for a web content request including state information that is not in compliance with a user's privacy directive. Upon detection of a copied packet having a web content request including noncompliant state information, the state information is modified to comply with the user's privacy directive. A replacement packet is forwarded to the user client such that the user client receives the replacement packet before receiving a response packet from a target server of the corresponding original packet. The replacement packet has a redirection with a renewed web content request including the modified state information.

In more detailed aspects of the invention, the state information may be client-server state information such as a cookie. Compliance with the user's privacy directive may be determined using an internet protocol (IP) address included in the copied packets. The web content request may be an http get command or an http post command. The copied packets may comprise packets mirrored to a content modification station.

In other more detailed aspects of the invention, the monitoring of the copied packets comprises determining whether a web content request including state information has a domain associated with targeted advertising, and comparing the domain associated with targeted advertising with a database of domains covered by the user's privacy directive. Also, modifying the state information may include setting a value in the state information to remove the user client from a targeted advertising program, and removing user private elements from the state information. The state information may be modified by a content modification station to comply with the user's privacy directive. The content modification station may not be in a path of the original packet between the user client and the target server. The monitoring, modifying, and forming steps may be performed by a service network providing asymmetric internet access to the user client.

Another aspect of the invention may reside in an apparatus for effecting an internet user's privacy directive. The apparatus includes means for monitoring copied packets, that are based on original packets sent from a user client, for a web content request including state information that is not in compliance with a user's privacy directive; means for modifying state information to comply with the user's privacy directive upon detection of a copied packet having a web content request including noncompliant state information; and means for forwarding a replacement packet to the user client such that the user client receives the replacement packet before receiving a response packet from a target server of the corresponding original packet, wherein the replacement packet has a redirection with a renewed web content request including the modified state information.

Yet another aspect of the present invention may reside in a computer program product comprising computer readable medium including: code for causing a computer to monitor copied packets, that are based on original packets sent from a user client, for a web content request including state information that is not in compliance with a user's privacy directive; code for causing a computer to modify state information to comply with the user's privacy directive upon detection of a copied packet having a web content request including noncompliant state information; code for causing a computer to forward a replacement packet to the user client such that the user client receives the replacement packet before receiving a response packet from a target server of the corresponding original packet, wherein the replacement packet has a redirection with a renewed web content request including the modified state information.

BRIEF DESCRIPTION OF THE DRAWINGS

The accompanying drawings illustrate embodiments of the present invention and, together with the description, serve to explain the principles of the invention.

FIG. 4 shows an exemplary replacement cookie, according to the present invention.

FIG. 5 shows an exemplary domain database for storing cookie modification parameters.

FIG. 7 shows an exemplary replacement packet generated by a content modification device.

FIG. 8 shows an exemplary user database for storing user service parameters, such as a privacy directive.

FIG. 9 is a flowchart illustrating a method for effecting a user's privacy directive, according to the present invention.

DETAILED DESCRIPTION

The present invention provides a method and apparatus for managing the privacy directives of web users for many advertising and personalization services in one click through a network device without incurring undesirable latency. A database is maintained of advertising network domains and cookie attributes for out-out. The database contains advertising networks that support opt-out as well as networks that do not support opt-out.

Incoming HTTP requests are examined for domain and cookie contents for determining whether a web user's privacy choices and directives are being respected. Outbound TCP port 80 traffic may be delivered to a content modification device by means of a device such as a mirror port or a tap which allows the network between a user client and the internet to continue at full speed because virtually no latency is induced by the content modification device.

The content modification device may modify the HTTP transaction by sending one or more packets directly to the originating computer and Service Network by taking on the IP address of the originally-requested web server. The new packet is destined to the originating computer on the Service Network and appears to be sent from the IP address of the web server. The TCP sequence value (SEQ) is an Acknowledgement number from the packet containing the HTTP Request and the TCP acknowledgement value (ACK) is the SEQ of the packet containing the HTTP Request plus the length of the TCP data in a spoof frame. The HTTP response in the application layer is a standard HTTP 302 redirection plus the addition of any modification to the cookie. This modification can include cookie removal instructions or the insertion of new cookie elements to preserve opt-out. The redirection can be made to any server containing any content that may be transmitted over HTTP. The Content Modification Device must be able to perform this packet insertion very quickly so as to arrive prior to the response from the web server.

The network appliance evaluates the HTTP transaction received by domain name or IP address. If the domain or IP address matches a record in the domain database, the cookie is inspected for any violations of the user's privacy directive. In the event of violation or the identification of any personal information, a new HTTP response may be constructed to remove the offending elements of the cookie and to place the opt-out criteria into the cookie if necessary.

The method provides persistent opt-out directives for all pertinent cookies for an entire household or local network.

Further, the network service provider provides the opt-out services to users via a network server-side solution, rather than via a client side software product for individual user cookie management.

Figure 1:
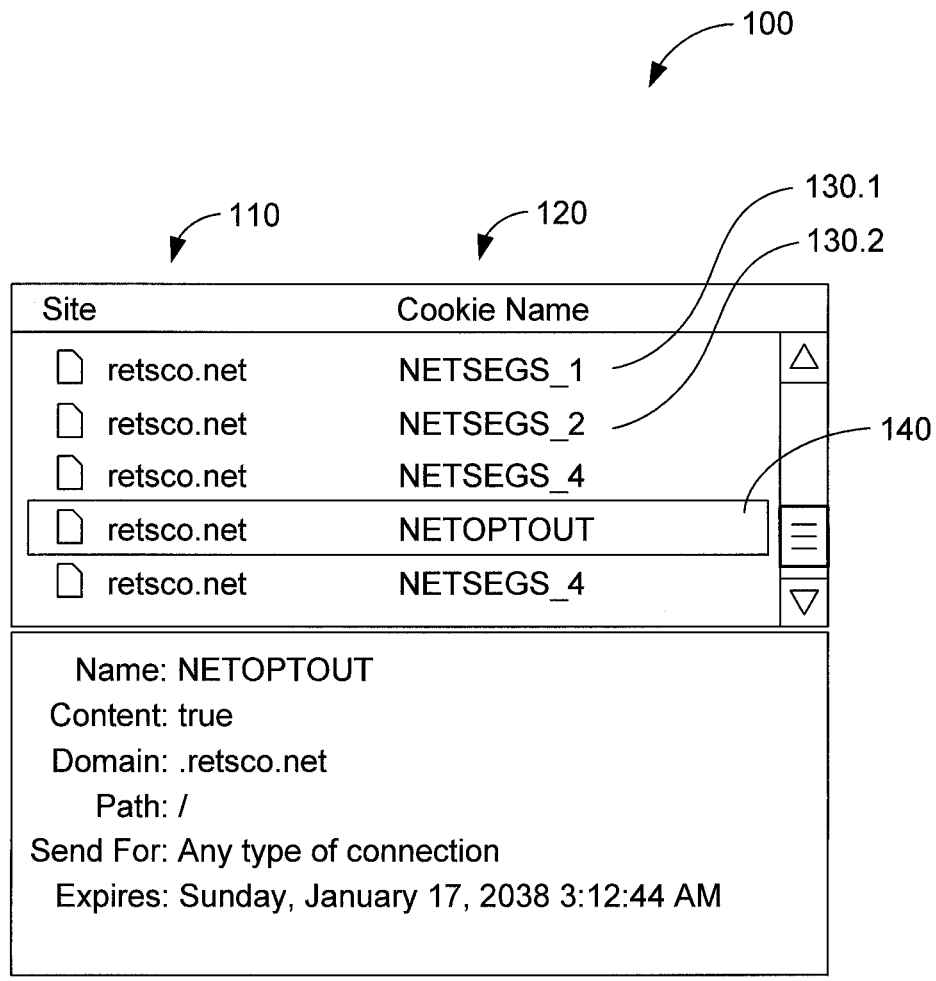
FIG. 1 is a screen shot showing an exemplary cookie structure.

With reference to FIG. 1, a exemplary display of a user's browser cookie table 100 shows a list 110 of domains for a corresponding list 120 of the cookies for a user browser instance. Each of the cookies, 130.1 and 130.2, has parameters such as content, domain, path, send for and expiration. In this instance, one cookie 140 represents an opt-out element indicating that a user has opted-out. It is noteworthy, that in this example, even though the user has opted out (element 140), certain private elements have not been removed.

Figure 2:
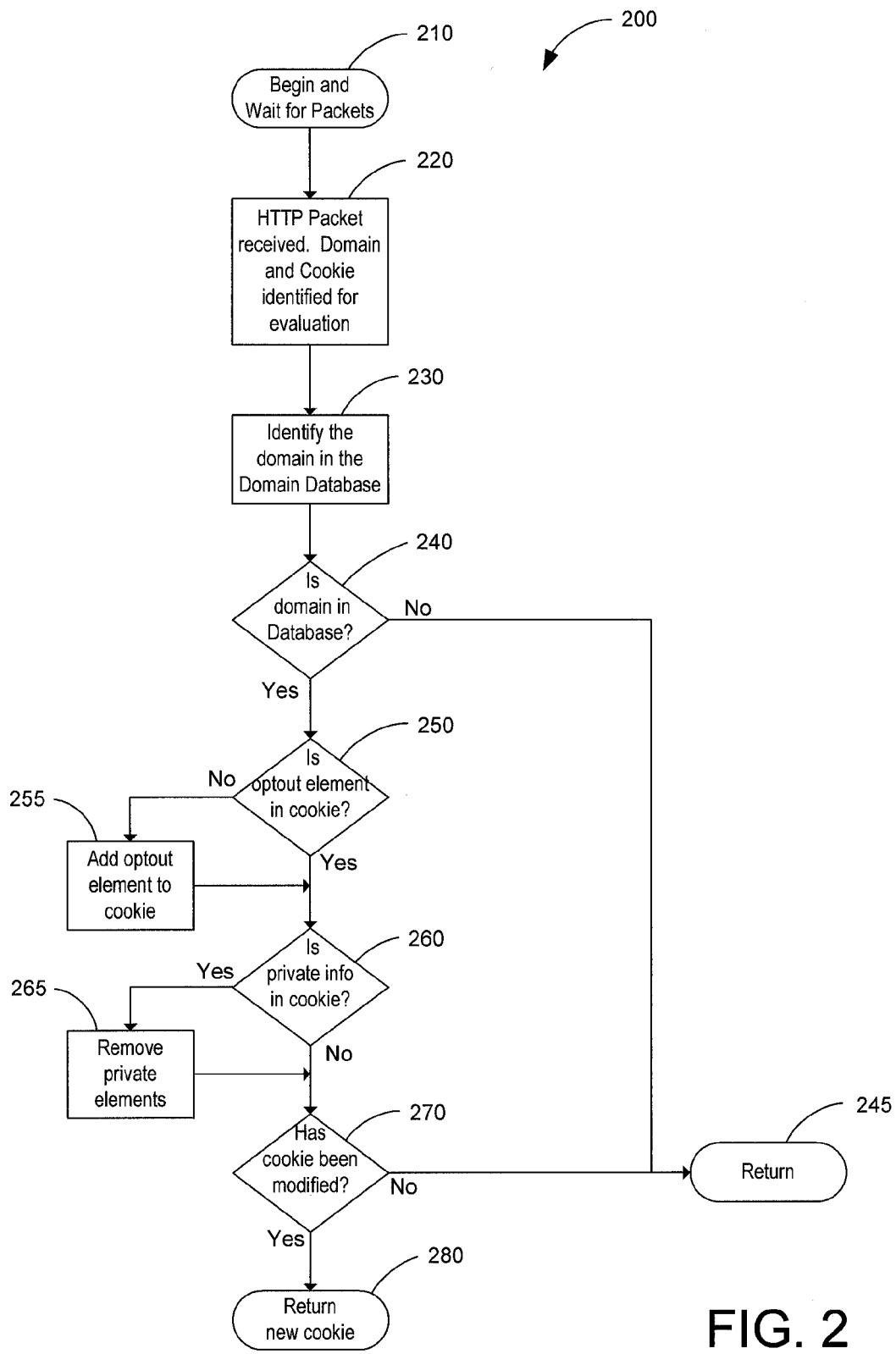
FIG. 2 is a flowchart illustrating a cookie modification process.

With reference to FIG. 2, cookies may be modified to comply with a user's privacy choices or directive. In describing FIG. 2, it is assumed that: 1) an Internet user is connected to the Internet through a service network of a network service provider having a content modification device that is capable of receiving the requests made by the user. The Internet user generates a request for content from a remotely located server such as an HTTP request for a web page. Input is received (step 210) by the HTTP modification process of FIG. 3. The packet is received for evaluation (step 220). The domain for the HTTP request is identified by using a Domain Database shown in FIG. 5 (step 230). If the domain matches a record in the table (step 240), the process proceeds to step 250, else process returns (step 245) to the parent process (FIG. 3) without any modification to the packet or metadata. Referring also to the domain database, opt-out elements in the cookie are identified (step 250). If opt-out element elements are not in the cookie, then the cookie is modified to add the opt-out elements. The cookie is evaluated to identify any other criteria found in the cookie that is not a part of the opt-out (step 260). If private criteria are found, then deletion instructions that will remove the private criteria from the cookie are added to the replacement cookie data (step 265). The results of steps 250 and 260 are evaluated and if either step produced a positive result (step 270), then the modified cookie is then returned to the parent process of FIG. 3 (step 280). Otherwise the routine returns with no modification (step 245).

Figure 3:
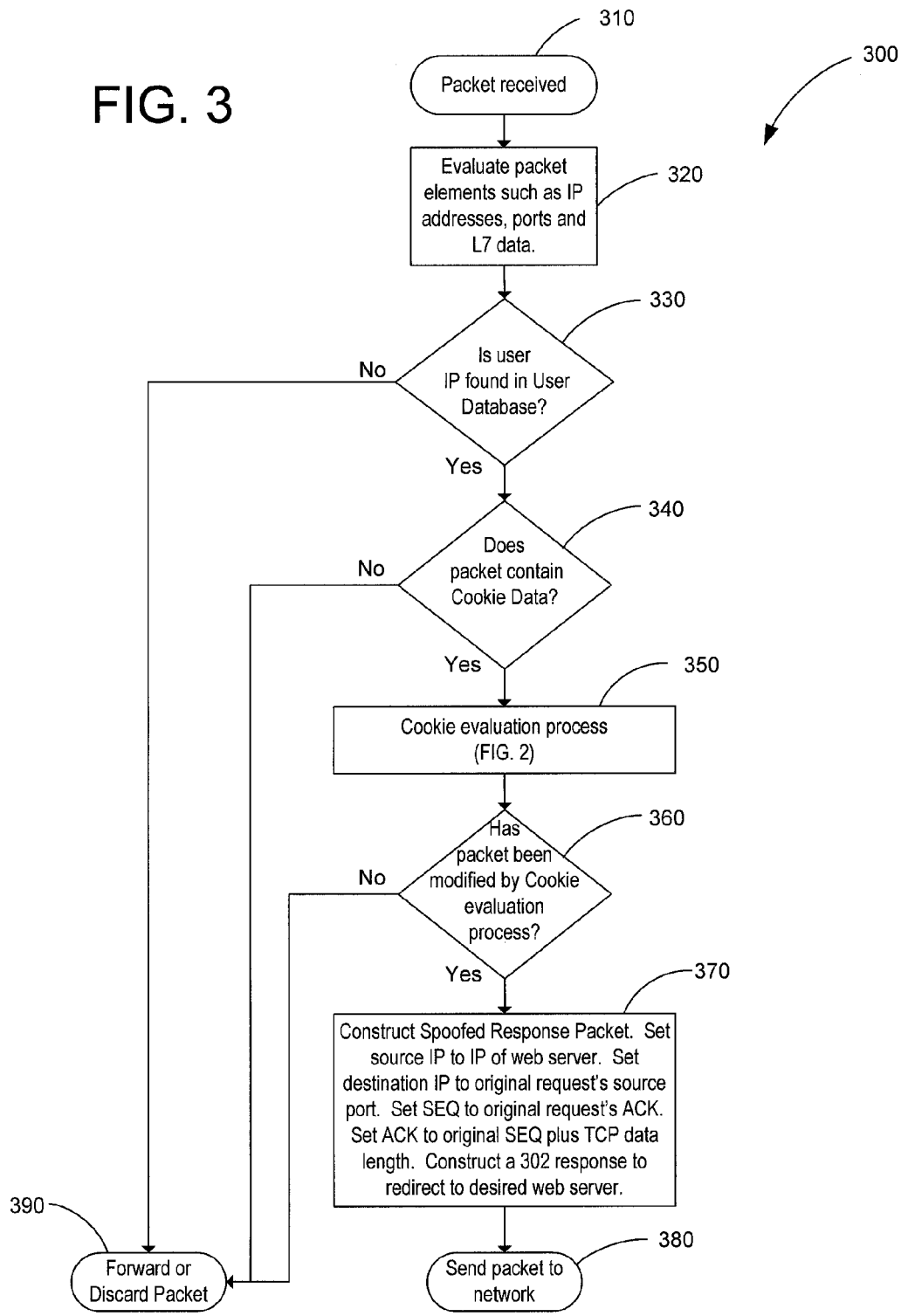
FIG. 3 is a flowchart illustrating a packet modification process.

With reference to FIG. 3, an HTTP packet is received by the content modification device (step 310). The packet is examined to determine network elements such as IP addresses, ports, and L7 data (step 320). The IP address found in the packet is compared against the User Database shown in FIG. 8 (step 330). If the IP address is not found, the packet is not eligible for modification and is discarded (step 390). If the IP address is found, then the packet is evaluated for to evaluate if there is cookie data in the request (step 340). If the packet is an there is cookie data in the request, the packet is sent to the cookie evaluation process of FIG. 2 (step 350). If the packet does not contain cookies data in the request, the packet is discarded (step 390). The response from the Cookie Evaluation Process is evaluated (step 360). If the response is not modified, the packet is discarded (step 390). If the response is modified, then a replacement or spoofed response packet is constructed (step 370). A 302 response to redirect to a desired web server is then encapsulated in the packet routing information, and the spoofed packet is sent back onto the network to be delivered to the requestor (step 380).

FIG. 4 shows an exemplary replacement cookie 400, according to the invention. Although the characteristics of the parameters in the cookie may vary, the structure is consistent with IETF RFC 2109 which describes the structure of a cookie. The command to Set-Cookie 410 is employed, instructing the web browser to accept the cookie. The cookie is modified with the attribute and the value for opt-out 420, wherein the example attribute is NAI and the example value is OPT_OUT. The path 430 is indicated. In this example, the path is for the full domain. The expiration time 440 of the cookie is set.

FIG. 5 shows an exemplary domain database 500 for storing cookie modification instructions for applicable domains. Use of this database is described above with respect to FIG. 2. The participant database 500 has: 1) a domain field, 510, containing the domain names for any domains for which cookie modification may be performed; 2) an opt-out key field, 520, containing the opt-out key attribute for the replacement cookie; and 3) an opt-out value field, 530, containing the value to be ascribed to the attribute.

Figure 6:
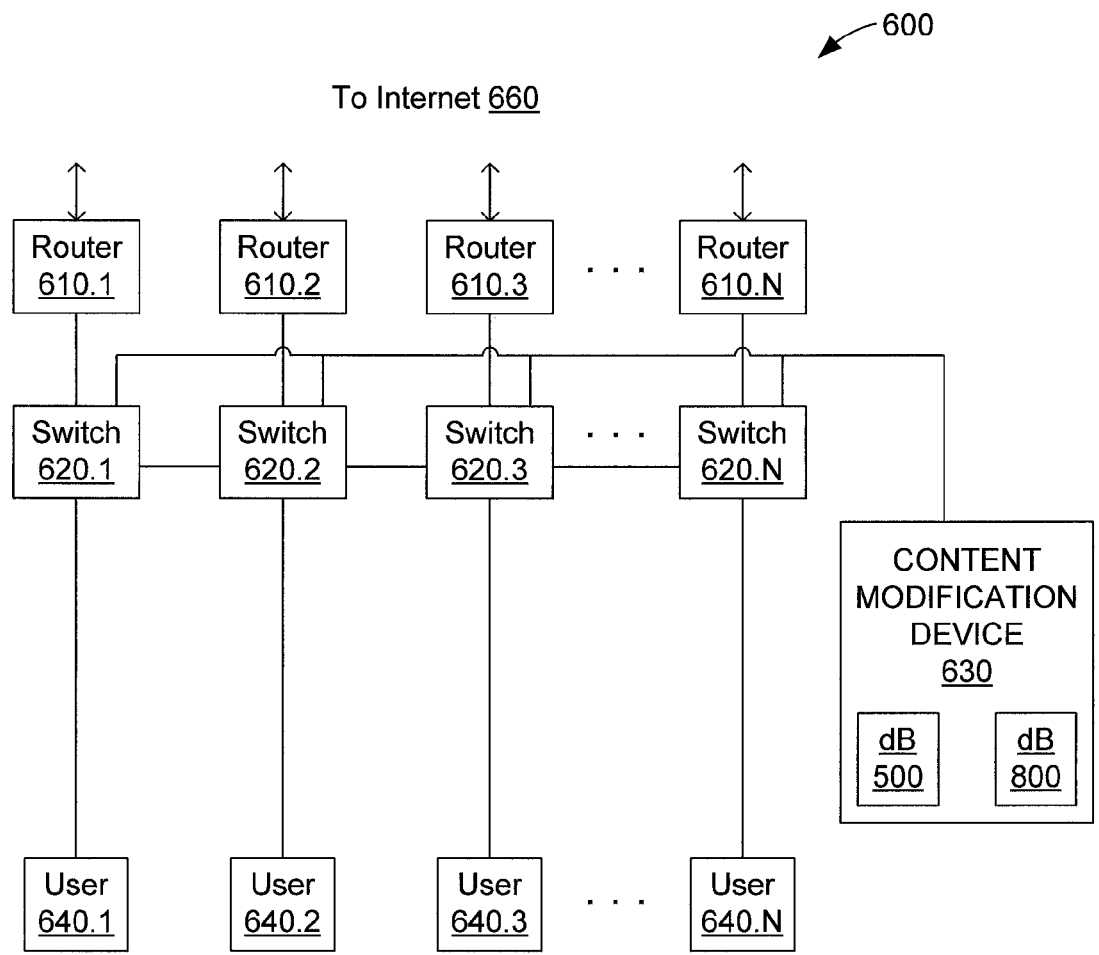
FIG. 6 is network diagram for an asymmetrically routed network using a content modification device.

FIG. 6 shows an exemplary network diagram for an asymmetrically routed network using a content modification device according to the present invention. In describing FIG. 6, it is assumed that: 1) there are multiple routers each with one or more connections to the Internet and configured using an asymmetric method (in the asymmetric method, packets related to the same flow may exit the local network through any router and be received through any router); 2) a TCP flow may be routed though router 610.1 and proceed to the remote host and be received by router 610.3 (the switched network will ensure that the packet reaches its intended destination); 3) there is a content modification device 630; and 4) the internet user generates a request for content from a remotely located server such as an HTTP request for a web page.

An internet user 640 requests a web page by selecting a domain in the web browser. The computer's TCP stack constructs a series of packets sent to the switched network 620. A copy of these packets is sent to the content modification device 630 through port mirroring, a tap or other similar methodology. Packets sent to the content modification device may be filtered by a rule that requires them to be TCP packets with port 80 or other HTTP port as the destination port in the packet. Return packets from the internet 660 may be received by any router 610 and sent over any path to the user client 640, and these packets from the internet are not needed by the content modification device. The content modification device may include, or have access to, the domain database 500 and the user database 800.

FIG. 7 shows an exemplary replacement packet 700 generated by the Content Modification Device. An IP header 710 is modified wherein the source address is the IP address of the server that was the destination of the original request, and the destination address is set to the IP address of the originating computer device. Other necessary IP headers 720 such as options and checksum are properly set according to standard Internet Protocol (RFC 791). The TCP headers 730 are modified wherein the source port is set to the destination port in the original request. The destination port is set to the source port of the original request. The TCP SEQ and ACK numbers 740 are modified wherein these values are set according to Transmission Control Protocol (RFC 675, et. al.). A TCP Checksum 750 is calculated according to standard Transmission Control Protocol. An HTTP response 760 is set wherein the replacement cookie is transmitted with a redirection to a destination which may be the same or a different destination. The response is sent to the user's computer causing the computer to generate a new HTTP request for this new content, completing the modification.

FIG. 8 shows an exemplary user database 800 for storing the service parameters of the users. Use of this database is described in FIG. 3. The participant database 800 has: 1) an IP address field 810 containing the current IP addresses of the users who may receive services from the content modification device 630; and 2) a service type field 820 containing one or more optional service types corresponding to types of cookies to be replaced. The service type field may have a value (1, 2, 3) to indicate a privacy directive. The value may correspond to increasing levels of requested privacy.

Figure 10:
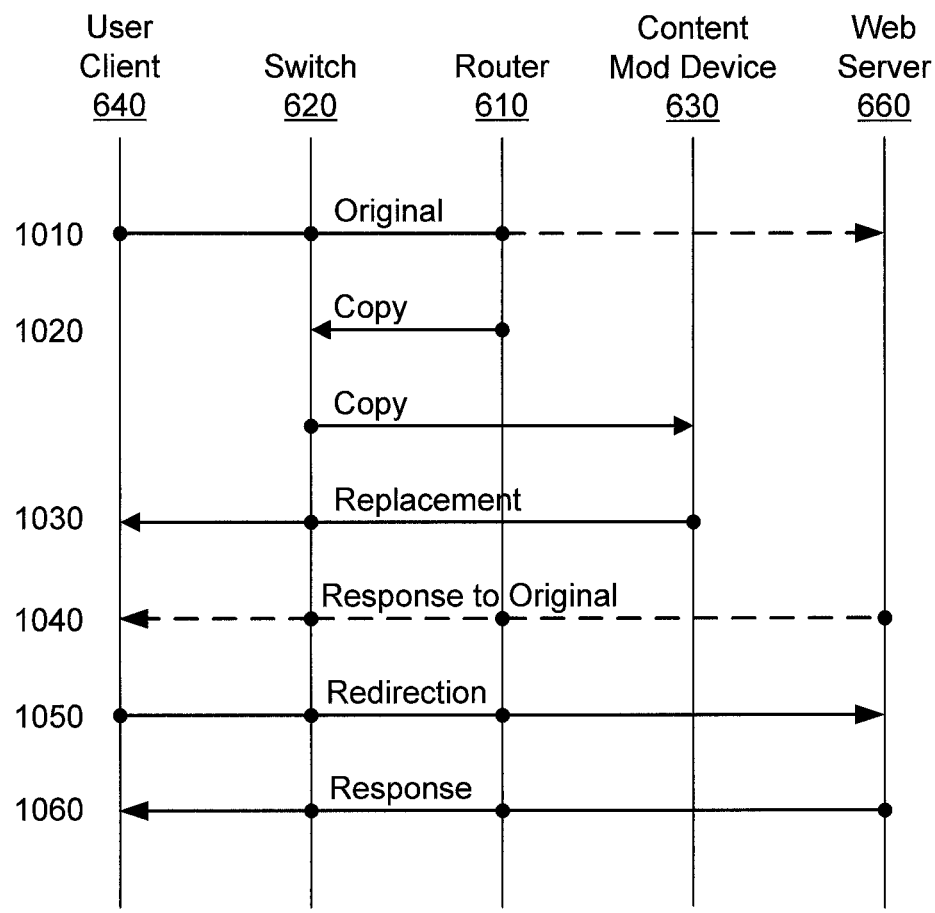
FIG. 10 is a schematic diagram showing transactions for effecting a user's privacy directive, according to the present invention.

With reference to FIGS. 9 and 10, an aspect of the present invention may reside in a method 900 for effecting an internet user's privacy directive. In the method, copied packets 1020, that are based on original packets 1010 sent from a user client 640, are monitored for a web content request including state information that is not in compliance with a user's privacy directive (step 910). Upon detection of a copied packet having a web content request including noncompliant state information (step 920), the state information is modified to comply with the user's privacy directive (step 930). A replacement packet 1030 (700 in FIG. 7) is forwarded to the user client such that the user client receives the replacement packet before receiving a response packet 1040 from a target server 660 of the corresponding original packet (step 940). The replacement packet has a redirection 1050 with a renewed web content request including the modified state information 400.

The state information may be client-server state information such as a cookie 140. Compliance with the user's privacy directive may be determined using an internet protocol (IP) address 810 included in the copied packets 1020. The web content request may be an http get command or an http post command. The copied packets may comprise packets mirrored to a content modification station or device 630.

The monitoring of the copied packets 1020 may comprise determining whether a web content request including state information has a domain associated with targeted advertising, and comparing the domain associated with targeted advertising with a database of domains 510 covered by the user's privacy directive. Also, modifying the state information may include setting a value 530 in the state information to remove the user client from a targeted advertising program, and removing user private elements from the state information. The state information may be modified by the content modification station 630 to comply with the user's privacy directive. Advantageously, the content modification station is not in a path of the original packet between the user client 640 and the target server 660. The monitoring, modifying, and forming steps may be performed by a service network of a network service provider providing asymmetric internet access to the user client.

Another aspect of the invention may reside in an apparatus for effecting an internet user's privacy directive. The apparatus includes means (630) for monitoring copied packets 1020, that are based on original packets 1010 sent from a user client 640, for a web content request including state information that is not in compliance with a user's privacy directive; means 630 for modifying state information to comply with the user's privacy directive upon detection of a copied packet having a web content request including noncompliant state information; and means (620 and 630) for forwarding a replacement packet 1030 to the user client such that the user client receives the replacement packet before receiving a response packet 1040 from a target server 660 of the corresponding original packet, wherein the replacement packet has a redirection 1050 with a renewed web content request 760 including the modified state information.

Yet another aspect of the present invention may reside in a computer program product comprising computer readable medium including: code for causing a computer to monitor copied packets 1020, that are based on original packets 1010 sent from a user client 640, for a web content request including state information that is not in compliance with a user's privacy directive; code for causing a computer to modify state information to comply with the user's privacy directive upon detection of a copied packet having a web content request including noncompliant state information; code for causing a computer to forward a replacement packet 1030 to the user client such that the user client receives the replacement packet before receiving a response packet 1040 from a target server 660 of the corresponding original packet, wherein the replacement packet has a redirection 1050 with a renewed web content request 760 including the modified state information 400.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for effecting an internet user's privacy directive, comprising:
    a device receiving copied packets, from a service network of a network service provider, that are based on original packets sent from a user client through the service network to an internet;
    the device monitoring the copied packets for a web content request including state information that is not in compliance with a user's privacy directive;
    upon detection of a copied packet having a web content request including noncompliant state information, the device modifying the state information to comply with the user's privacy directive; and
    the device forwarding a replacement packet through the service network to the user client such that the user client receives the replacement packet before receiving a response packet from a target server of the corresponding original packet, wherein the replacement packet includes a redirection with a renewed web content request including the modified state information.

2. A method for effecting an internet user's privacy directive as defined in claim 1, wherein the state information is a cookie.

3. A method for effecting an internet user's privacy directive as defined in claim 1, wherein the state information is client-server state information.

4. A method for effecting an internet user's privacy directive as defined in claim 1, wherein the device monitoring the copied packets comprises the device determining whether a web content request including state information has a domain associated with targeted advertising, and the device comparing the domain associated with targeted advertising with a database of domains covered by the user's privacy directive.

5. A method for effecting an internet user's privacy directive as defined in claim 1, wherein the device modifying the state information includes the device setting a value in the state information to remove the user client from a targeted advertising program.

6. A method for effecting an internet user's privacy directive as defined in claim 1, wherein compliance with the user's privacy directive is determined using an internet protocol (IP) address included in the copied packets.

7. A method for effecting an internet user's privacy directive as defined in claim 1, wherein the device modifying the state information includes the device removing user private elements from the state information.

8. A method for effecting an internet user's privacy directive as defined in claim 1, wherein the web content request is an http get command.

9. A method for effecting an internet user's privacy directive as defined in claim 1, wherein the web content request is an http post command.

10. A method for effecting an internet user's privacy directive as defined in claim 1, wherein the service network provides asymmetric internet access to the user client.

11. A method for effecting an internet user's privacy directive as defined in claim 10, wherein:
the device comprises a content modification station; and
the copied packets comprise packets mirrored to the content modification station.

12. A method for effecting an internet user's privacy directive as defined in claim 11, wherein:
the state information is modified by the content modification station to comply with the user's privacy directive; and
the content modification station is not in a path of the original packet between the user client and the target server.

13. An apparatus for effecting an internet user's privacy directive, comprising:
means for receiving copied packets, from a service network of a network service provider, that are based on original packets sent from a user client through the service network to an internet;
means for monitoring the copied packets for a web content request including state information that is not in compliance with a user's privacy directive;
means for modifying state information to comply with the user's privacy directive upon detection of a copied packet having a web content request including noncompliant state information; and
means for forwarding a replacement packet through the service network to the user client for reception by the user client before reception by the user client of a response packet from a target server of the corresponding original packet, wherein the replacement packet includes a redirection with a renewed web content request including the modified state information.

14. An apparatus for effecting an internet user's privacy directive as defined in claim 13, wherein the state information is a cookie.

15. An apparatus for effecting an internet user's privacy directive as defined in claim 13, wherein the state information is client-server state information.

16. An apparatus for effecting an internet user's privacy directive as defined in claim 13, wherein compliance with the user's privacy directive is determined using an internet protocol (IP) address included in the copied packets.

17. An apparatus for effecting an internet user's privacy directive as defined in claim 13, wherein the copied packets comprise mirrored packets.

18. A computer program product, comprising:
non-transitory computer readable medium storing:
code for causing a computer to receive copied packets, from a service network of a network service provider, that are based on original packets sent from a user client through the service network to an internet;
code for causing a computer to monitor the copied packets for a web content request including state information that is not in compliance with a user's privacy directive;
code for causing a computer to modify state information to comply with the user's privacy directive upon detection of a copied packet having a web content request including noncompliant state information; and
code for causing a computer to forward a replacement packet through the service network to the user client for reception by the user client before reception by the user client of a response packet from a target server of the corresponding original packet, wherein the replacement packet includes a redirection with a renewed web content request including the modified state information.

19. A computer program product as defined in claim 18, wherein the state information is a cookie.

20. A computer program product as defined in claim 18, wherein the state information is client-server state information.

21. A computer program product as defined in claim 18, wherein compliance with the user's privacy directive is determined using an internet protocol (IP) address included in the copied packets.

* * * * *